US010487566B2

(12) United States Patent
Sciulli et al.

(10) Patent No.: US 10,487,566 B2
(45) Date of Patent: Nov. 26, 2019

(54) ZERO LASH TORQUE TRANSFER JOINT

(71) Applicant: Bendix Commercial Vehicle Systems LLC, Elyria, OH (US)

(72) Inventors: Mark H. Sciulli, Lorain, OH (US); Jeffrey J. Krause, Wellington, OH (US); Timothy J. Beckwith, Berlin Heights, OH (US); Thomas W. Grieve, Spencer, OH (US); John J. Drabczyk, Parma, OH (US); William A. Singleton, Grafton, OH (US); Dustin Carpenter, Chippewa Lake, OH (US); Cody Scibetta, Cleveland, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 174 days.

(21) Appl. No.: 15/704,555

(22) Filed: Sep. 14, 2017

(65) Prior Publication Data

US 2019/0078374 A1 Mar. 14, 2019

(51) Int. Cl.
*E05F 17/00* (2006.01)
*F16H 21/44* (2006.01)
*E05F 15/63* (2015.01)
*E05F 15/40* (2015.01)

(52) U.S. Cl.
CPC ............. *E05F 17/00* (2013.01); *E05F 15/63* (2015.01); *E05F 17/004* (2013.01); *F16H 21/44* (2013.01); *E05F 15/40* (2015.01); *E05F 2017/008* (2013.01); *E05Y 2900/506* (2013.01); *Y10T 403/7041* (2015.01)

(58) Field of Classification Search
CPC ........ E05F 17/00; E05F 17/004; E05F 17/008

USPC .... 403/383, 379.3, 194, 196, 233–236, 306, 403/359.6
See application file for complete search history.

(56) References Cited

U.S. PATENT DOCUMENTS

| 1,062,486 A | * | 5/1913 | Lord | .................... | B23B 31/1074 |
| | | | | | 279/97 |
| 1,332,626 A | * | 3/1920 | Henegar | ................ | F16B 43/007 |
| | | | | | 24/1 |
| 1,797,730 A | * | 3/1931 | Pfauser | ................ | B25B 23/0035 |
| | | | | | 403/362 |
| 2,629,616 A | * | 2/1953 | McVey | .................... | F16B 21/16 |
| | | | | | 403/362 |

(Continued)

OTHER PUBLICATIONS

Examination Report issued in corresponding Canadian Patent Application No. 3,017,150 (dated Aug. 29, 2019).

*Primary Examiner* — Marcus Menezes
(74) *Attorney, Agent, or Firm* — Reising Ethington P.C.

(57) ABSTRACT

A system for transferring torque with zero lash from a driver to a driven object is provided. The system includes a shaft disposed about a rotational axis and a hub defining a bore that receives the shaft. The shaft and hub are each configured for coupling to one of the driver and driven object. The shaft defines a flat on a radially outer surface and the hub defines a flat on a radially inner surface opposing the flat in the shaft. In one embodiment, the shaft includes a threaded bore and the hub includes an aligned through bore. Rotation of a threaded fastener in the bores draws the flat into engagement. In another embodiment, the hub includes a threaded through bore. Rotation of a fastener extending through the bore and engaging the shaft diametrically opposite the flats urges the flats into engagement.

14 Claims, 5 Drawing Sheets

(56) References Cited

U.S. PATENT DOCUMENTS

| | | | | |
|---|---|---|---|---|
| 2,830,635 | A | * | 4/1958 | Thorstens ............ F16B 39/286 411/259 |
| 2,893,506 | A | * | 7/1959 | Daugirdas ............... E05F 15/40 180/286 |
| 2,933,934 | A | * | 4/1960 | Haroldson .............. F16H 55/36 254/390 |
| 3,709,633 | A | * | 1/1973 | Wooden ................ F04D 29/263 416/134 R |
| 4,035,098 | A | * | 7/1977 | Griffin ................... F16B 21/10 403/356 |
| 4,172,341 | A | * | 10/1979 | Klein, Sr. .............. B23D 73/14 279/83 |
| 4,270,063 | A | * | 5/1981 | Dochterman ........ F16D 1/0847 292/349 |
| 4,402,625 | A | | 9/1983 | Rechkin |
| 5,332,279 | A | * | 7/1994 | Golemis ................ B60J 5/0497 192/69.6 |
| 5,613,693 | A | * | 3/1997 | Ramunas ............... B21D 28/34 279/76 |
| 6,299,180 | B1 | * | 10/2001 | Satran ................ B23B 31/1075 279/83 |
| 7,112,020 | B2 | * | 9/2006 | Sheffler ................ B23B 31/005 279/83 |
| 7,213,890 | B2 | | 5/2007 | Porter et al. |
| 7,524,132 | B2 | | 4/2009 | Horen et al. |
| 2011/0274512 | A1 | | 11/2011 | Neary |
| 2016/0009129 | A1 | | 1/2016 | Masuda et al. |
| 2016/0060911 | A1 | | 3/2016 | Krause et al. |

\* cited by examiner

ZERO LASH TORQUE TRANSFER JOINT

BACKGROUND OF THE INVENTION a. Field of the Invention

This invention relates to systems for use in opening and closing bus doors. In particular, the invention relates to a system that forms a joint for transferring torque from a driver to a driven object such as a bus door with zero lash.

b. Background Art

A conventional system for opening and closing a multi panel bus door includes an electric motor and a series of gears that impart rotation to a shaft. A bell crank hub is coupled to the shaft and rotates with the shaft. A pair of linkages connect arms on the bell crank hub to panels of the bus door. The shaft and the hub are coupled for rotation through a key/keyway connection. In order to permit assembly of the system, tolerances are built into the system between the shaft, hub and key. These tolerances result in a degree of lash or lost motion whenever rotation of the shaft is initiated by the motor. The lash is amplified through the system and results in undesirable motion of the panels in the bus door.

Lash can be eliminated by joining the shaft and hub in an interference or press fit or by welding the shaft and hub together. A press fit joint, however, is difficult to implement and to assemble. In a welded joint, the heat generated during the welding process can create undesirable affects and post-welding corrosion protection can undesirably impact nearby structures. Both press fit and welded joints also inhibit servicing of the shaft and hub.

The inventors herein have recognized a need for a system for opening and closing a door such as a bus door and, more generally, a system for transferring torque from a driver to a driven object that will minimize and/or eliminate one or more of the above-identified deficiencies.

BRIEF SUMMARY OF THE INVENTION

This invention relates to systems for use in opening and closing bus doors. In particular, the invention relates to a system that forms a joint for transferring torque from a driver to a driven object such as a bus door with zero lash.

A system for transferring torque from a driver to a driven object in accordance with one embodiment includes a shaft configured for coupling to one of the driver and the driven object and disposed about a rotational axis. The shaft defines a flat on a radially outer surface of the shaft and defines a threaded bore extending from the radially outer surface of the shaft towards the axis. The system further includes a hub configured for coupling to the other of the driver and the driven object and defining a bore configured to receive the shaft therein. The hub defines a flat on a radially inner surface of the hub opposing the flat on the shaft and defines a through bore aligned with the threaded bore in the shaft. The system further includes a fastener extending through the through bore in the hub and into the threaded bore in the shaft. Rotation of the fastener draws the flat on the hub towards the flat on the shaft.

A system for transferring torque from a driver to a driven object in accordance with another embodiment includes a shaft configured for coupling to one of the driver and the driven object and disposed about a rotational axis. The shaft defines a flat on a radially outer surface of the shaft. The system further includes a hub configured for coupling to the other of the driver and the driven object and defining a bore configured to receive the shaft therein. The hub defines a flat on a radially inner surface of the hub opposing the flat on the shaft and defines a threaded through bore extending from a radially outer surface of the hub to the radially inner surface of the hub. The system further includes a fastener extending through the threaded through bore in the hub and engaging the radially outer surface of the shaft diametrically opposite the flat on the radially outer surface of the shaft. Rotation of the fastener urges the flat on the hub towards the flat on the shaft.

A system for opening and closing a door in accordance with one embodiment includes a shaft disposed about a rotational axis. The shaft defines a flat on a radially outer surface of the shaft and defines a threaded bore extending from the radially outer surface of the shaft towards the axis. The system further includes means for rotating the shaft about the rotational axis. The system further includes a hub configured for coupling to the door and defining a bore configured to receive the shaft therein. The hub defines a flat on a radially inner surface of the hub opposing the flat on the shaft and defines a through bore aligned with the threaded bore in the shaft. The system further includes a fastener extending through the through bore in the hub and into the threaded bore in the shaft. Rotation of the fastener draws the flat on the hub towards the flat on the shaft.

A system for opening and closing a door in accordance with another embodiment includes a shaft disposed about a rotational axis. The shaft defines a flat on a radially outer surface of the shaft. The system further includes means for rotating the shaft about the rotational axis. The system further includes a hub configured for coupling to the door and defining a bore configured to receive the shaft therein. The hub defines a flat on a radially inner surface of the hub opposing the flat on the shaft and defines a threaded through bore extending from a radially outer surface of the hub to the radially inner surface of the hub. The system further includes a fastener extending through the threaded through bore in the hub and engaging the radially outer surface of the shaft diametrically opposite the flat on the radially outer surface of the shaft. Rotation of the fastener urges the flat on the hub towards the flat on the shaft.

A system in accordance the present teachings represents an improvement as compared to conventional systems for transferring torque and, ultimately, for opening and closing doors such as bus doors. In particular, the system enables torque transfer with zero lash or lost motion. The shaft and hub in the system are also relatively easy to manufacture using common manufacturing techniques such as turning, broaching and/or milling and the system employs common fasteners. Therefore, the system is relatively inexpensive. The joint is also relatively easy to assemble and disassemble—and therefore service—using common tools.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
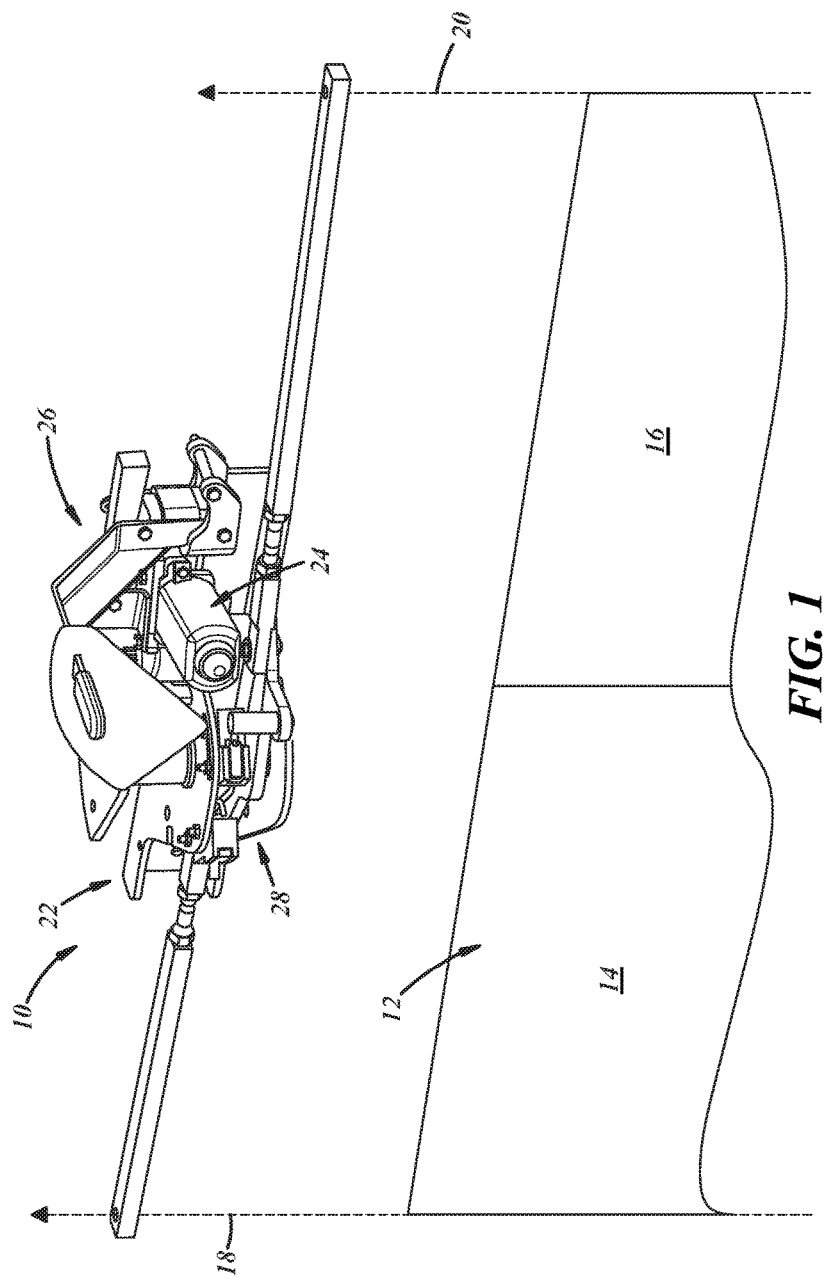
FIG. 1 is a perspective view of one embodiment of a system for opening and closing a door and, in particular, a multi-panel bus door.
Figure 2:
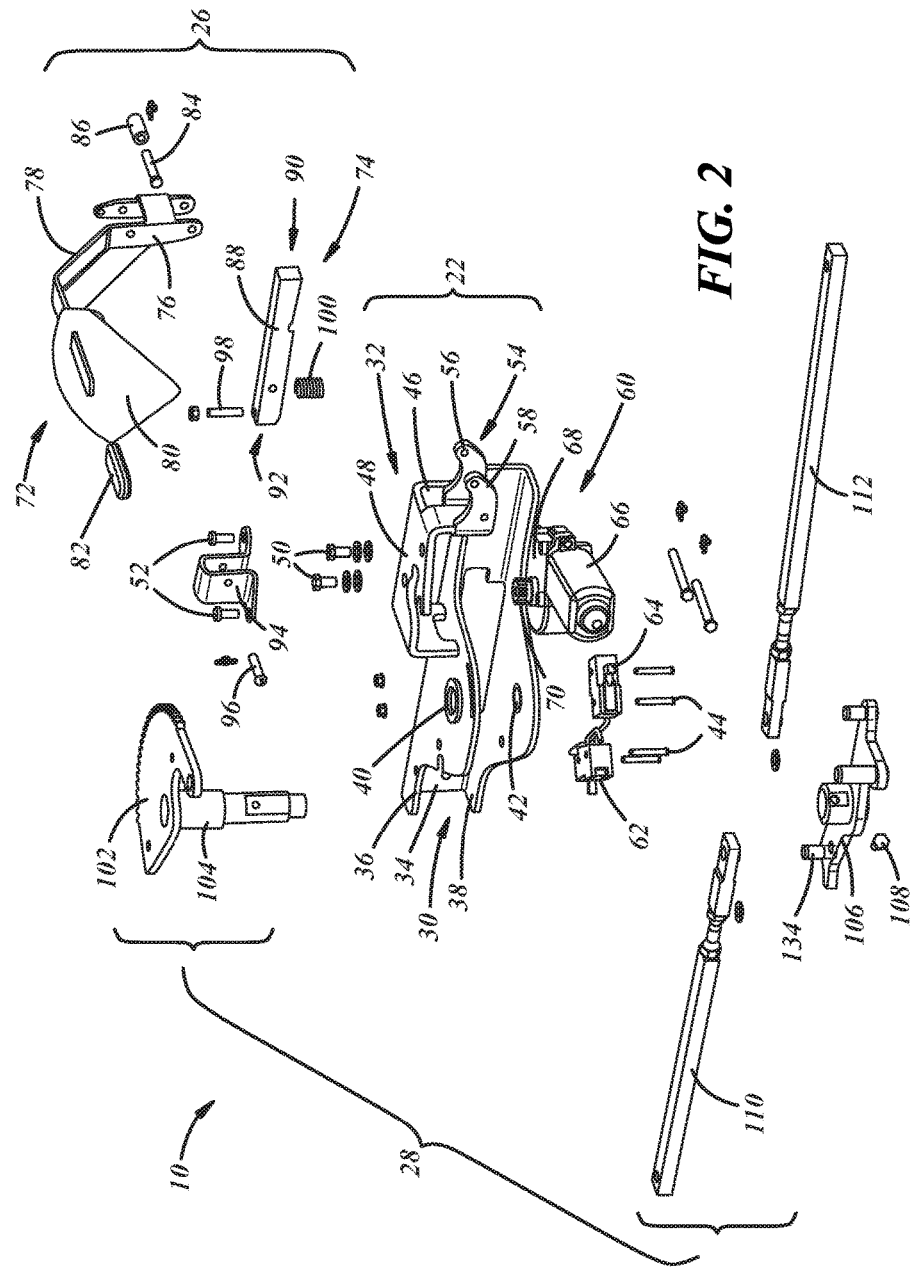
FIG. 2 is an exploded perspective view of the system of FIG. 1.

Referring now to the drawings wherein like reference numerals are used to identify identical components in the various views, FIGS. 1-2 illustrates a system 10 for opening and closing a door 12. In accordance with one embodiment, door 12 comprises a multi-panel door used on a passenger bus. It should be understood, however, that door 12 could be used to control access to other types of vehicles and could also be used in non-vehicular applications including, for example, to control access to buildings. Referring to FIG. 1, door 12 includes two panels 14, 16 that pivot about corresponding axes 18, 20 between open and closed positions under the control of system 10. System 10 may include a mounting frame 22, a driver or motion control system 24, an override system 26 for system 24 and, a system 28 for transferring torque from a driver such as system 24 to a driven object such as door 12.

Referring now to FIG. 2, mounting frame 22 is provided to mount various components of system 10 and to position and orient those components relative to one another. Frame 22 may include multiple members 30, 32.

Member 30 may be configured to mount elements of motion control system 24 and torque transfer system 28. Member 30 is substantially C-shaped in cross-section having an end wall 34 and a pair of opposed side walls 36, 38 extending from end wall 34. Side walls 36, 38 include aligned openings 40, 42 configured to receive bushings (not shown) that allow portions of system 28 to rotate relative to member 30 as described below. Side walls 36, 38 may also define openings configured to receive fasteners 44 used in coupling components of motion control system 24 to member 30 as described below.

Member 32 may be configured to mount elements of motion control system 24 and override system 26. Member 32 may be coupled to member 30 using conventional fasteners such as welds or adhesives or may be formed as unitary (one-piece) body with member 30. Member 32 includes an end wall 46 that may be co-planar with end wall 34 of member 30 and a side wall 48 that extends from end wall 46 in a direction general parallel to side walls 36, 38 of member 30. Side wall 48 may define a plurality of openings configured to receive fasteners 50, 52 used to mount portions of motion control system 24 and override system 26, respectively, to member 32 as well as openings through which elements of motion control system 24 and override system 26 may extend. A mounting bracket 54 extending from one end of side wall 48 may include a pair of spaced arms 56, 58 configured to mount other portions of override system 26 as described below.

Motion control system 24 is provided to control movement of torque transfer system 28 to open and close door 12. System 24 may include an actuator 60 and position sensors 62, 64.

Actuator 60 is provided to generate torque to rotate components of torque transfer system 28 as described in greater detail below. In the illustrated embodiment, actuator 60 includes an electric motor 66 and a gear drive 68 that transfers torque from an output shaft of motor 66 to a pinion gear 70. Although actuator 60 includes an electric motor 66 in the illustrated embodiment, it should be understood that other types of actuators could be used including fluid (pneumatic or hydraulic actuators) or manual actuators. Actuator 60 may be mounted to member 32 of frame 22 using fasteners 50 that extend through member 32 and into the housing for gear drive 68. Motor 66 may in turn be coupled to the housing for gear drive 68. Motor 66 and the housing for gear drive 68 may be disposed on one side of side wall 48 of frame member 32 while a shaft supporting pinion gear 70 extends through side wall 48 such that pinion gear 70 is disposed on an opposite side of side wall 48. Motor 66 may be controlled using a controller (not shown) that is responsive to signals generated from a user interface (e.g., a pushbutton switch or other control device mounted within a vehicle and actuated by a driver or other vehicle occupant) and signals generated by position sensors 62, 64.

Position sensors 62, 64 (or "limit stops") provide an indication of the position or degree of rotation of a component of torque transfer system 28. Sensors 62, 64 are activated by physical contact between the sensors 62, 64 and a component of system 28. When activated, sensors 62, 64 generate signals that are transmitted to the controller for motor 66 in order to halt further rotation of the motor shaft, pinion gear 70 and, ultimately, components of system 28. Sensor 62 establishes a limit for rotation of components of system 28 in one rotational direction while sensor 64 establishes a limit for rotation of components of system 28 in the opposite rotational direction. Sensors 62, 64 may be disposed between side walls 36, 38 of frame member 30 and may be mounted to frame member 30 using fasteners 44.

Override system 26 is provided to disconnect motion control system 24 from torque transfer system 28 in the event of an emergency (e.g., if motor 66 fails). System 26 may include a handle assembly 72 and an actuator assembly 74.

Handle assembly 72 is provided to create movement in actuator assembly 74. In the illustrated embodiment, handle assembly 72 includes a bracket 76 that is configured for pivotal connection to bracket 54 in frame member 32 and an arm 78 that extends from bracket 76 and may be grasped by a hand or another means. A protective shield 80 and a grip 82 may be mounted on the arm 78. The mounting bracket 76 defines aligned apertures configured to receive a pin 84 that supports a roller 86.

Actuator assembly 74 is provided to displace pinion gear 70 responsive to movement of handle assembly 72 in order to disengage systems 24, 28. Assembly 74 includes a lever arm 88 that is supported proximate to one end 90 on roller 86 of handle assembly 70. The opposite end 92 of arm 88 is configured to be received within a bracket 94 that may be affixed to frame member 32 using fasteners 52. A pin 96 extends through bracket 94 and end 92 of arm 88 and defines a pivot axis for arm 88. A set screw 98 is mounted within a bore in end 92 of arm 88. Upon movement of handle assembly 72, set screw 98 engages pinion gear 70 of gear drive 68 to displace gear 70 and disengage systems 24, 28. A spring 100 disposed between frame member 32 and arm 88 biases arm 88 to a position in which set screw 98 is disengaged from gear 70. Movement of arm 78 of handle assembly 72 causes bracket 76 of assembly 72 to pivot relative to bracket 54 of frame member 32 and to move roller 86 along the underside of arm 88. The movement of roller 86 causes end 90 of lever arm 88 to move upward and end 92 of lever arm 88 to move downward against the biasing force of spring 100 thereby forcing set screw 98 into engagement with pinion gear 70 to displace pinion gear 70.

Figure 3:
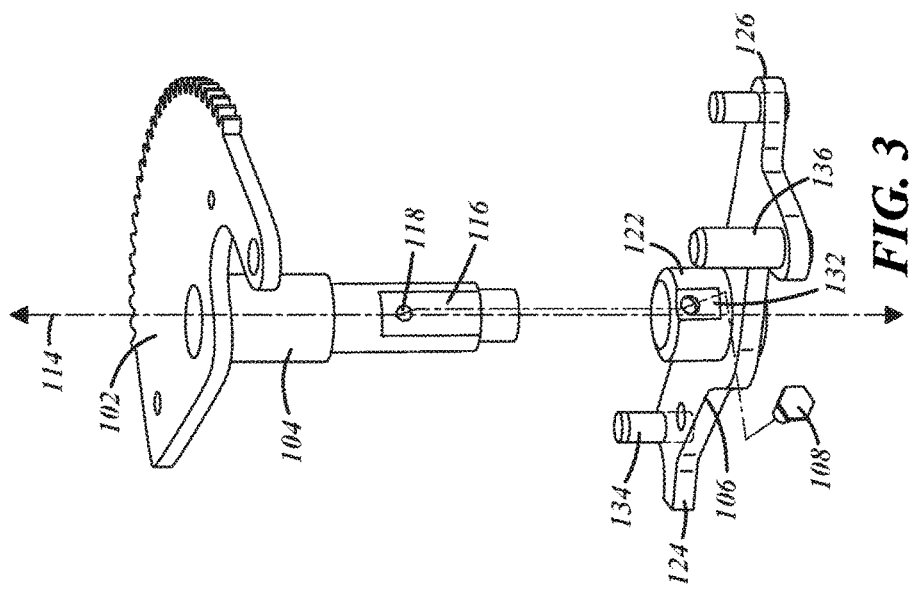
FIG. 3 is an exploded perspective view of a portion of the system of FIG. 1 and, in particular, one embodiment of a system for transferring torque from a driver to a driven object such as a bus door.

System 28 is provided to transfer torque from a driver, such as motion control system 24, to a driven object, such as bus door 12. Referring to FIGS. 2-3, system 28 may include a sector gear 102, shaft 104, a hub 106, a fastener 108 and linkages 110, 112. System 28—and particularly shaft 104 and hub 106—are configured for oscillating movement about axis 114 at relatively low speeds (as opposed to rotating about axis 114 at relatively high speeds) and have an angular motion of less than three hundred and sixty degrees.

Sector gear 102 is provided to transmit torque from pinion gear 70 of motion control system 24 to shaft 104. Gear 102 is coupled to one longitudinal end of shaft 104 and is configured for rotation with shaft 104 about a rotational axis 114. Gear 102 includes a set of teeth extending along a circumferential arc that are configured to mate with teeth on pinion gear 70.

Figure 4:
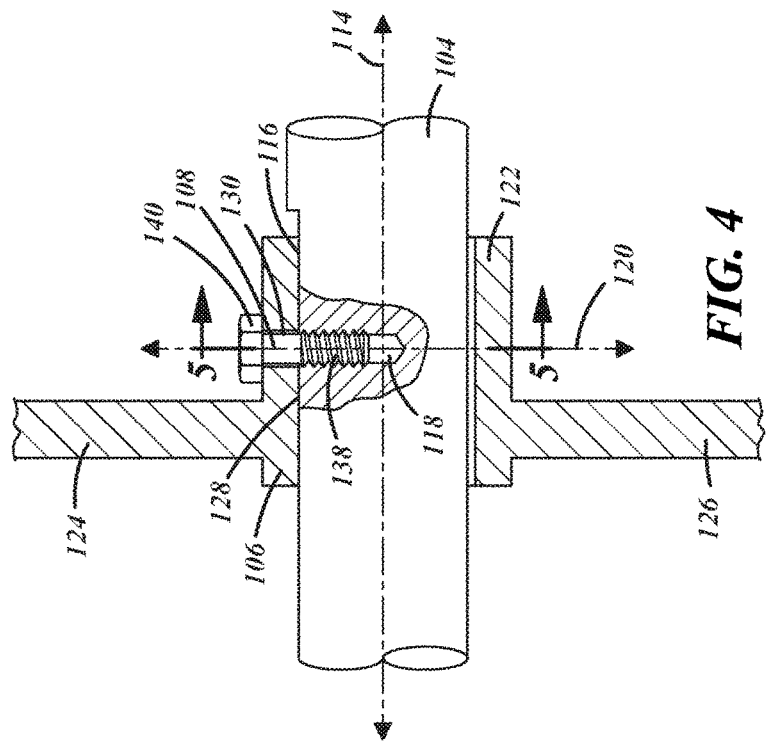
FIGS. 4-5 are cross-sectional views of a portion of the system of FIG. 3.

Shaft 104 transmits torque from sector gear 102 to hub 106. Shaft 104 is disposed about axis 114 and configured for rotation about axis 114. Shaft 104 is coupled to sector gear 102 at one longitudinal end of shaft 104 and to hub 106 proximate the opposite longitudinal end of shaft 104. Shaft 104 is generally circular in cross-section and the diameter of shaft 104 may vary along its length. In accordance with the present teachings, shaft 104 is configured to form a zero lash joint with hub 106. Referring to FIG. 3, a portion of shaft 104 configured to be received within hub 106 defines a flat 116 on a radially outer surface of the shaft 104 that is configured to engage hub 106 as described below. Aside from flat 116, the radially outer surface of shaft 104 is rounded. The same portion of shaft 104 defines a threaded bore 118 that extends from the radially outer surface of shaft 104 towards axis 114. Bore 118 terminates at flat 116 on the radially outer surface of shaft 104. Referring to FIG. 4, the bore 118 may be centered about an axis 120 extending perpendicular to rotational axis 114. Although bore 118 is a blind bore in the illustrated embodiment, bore 118 could alternatively be constructed as a through bore.

Figure 5:
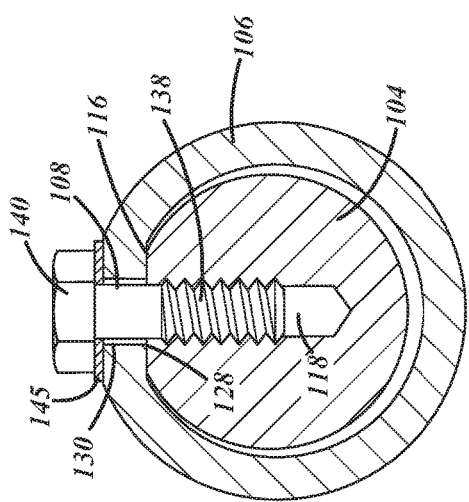

Referring again to FIG. 3, hub 106 transmits torque from shaft 104 to linkages 110, 112. Hub 106 is disposed about axis 114 and configured for rotation about axis 114. In the illustrated embodiment, hub 106 comprises a bell crank hub having a central sleeve 122 and a pair of arms 124, 126, extending radially outward from sleeve 122. Sleeve 122 is annular in shape and defines a bore configured to receive shaft 104. In particular, the bore through sleeve 122 has a shape complementary to the shape of shaft 104. Referring to FIGS. 4-5, in accordance with the present teachings, sleeve 122 defines a flat 128 on a radially inner surface configured for alignment with, and opposing, flat 116 on shaft 104. Aside from flat 128, the radially inner surface of sleeve 122 is rounded. Sleeve 122 also defines a through bore 130 configured for alignment with bore 118 in shaft 104. Bore 130 terminates at flat 128 on the radially inner surface of hub 106 and may be centered about axis 120. Referring again to FIG. 3, sleeve 122 may have a shape that is complementary to a shape of fastener 108—and, in particular, a head of fastener 108—and is configured to engage the head of fastener 108. In particular, sleeve 122 may further define a flat 132 on a radially outer surface configured to engage the head of fastener 108. Arms 124, 126 are provided for connection to linkages 110, 112, respectively. Arms 124, 126 may extend radially from sleeve 122 and may be diametrically opposite one another. Each arm 124, 126 includes a stub 134 proximate a radially outer end of the arm 124, 126 for connection to a corresponding linkage 110, 112. Arm 126 further includes a flange from which a pin 136 extends. Pin 136 is configured to activate position sensors 62, 64 upon a predetermined degree of rotation by hub 106 about axis 114 in either rotational direction in order to halt the operation of motor 66 and, therefore, further rotation of hub 106. The degree of rotation may correspond to fully open and fully closed positions of door 12.

Figure 7:
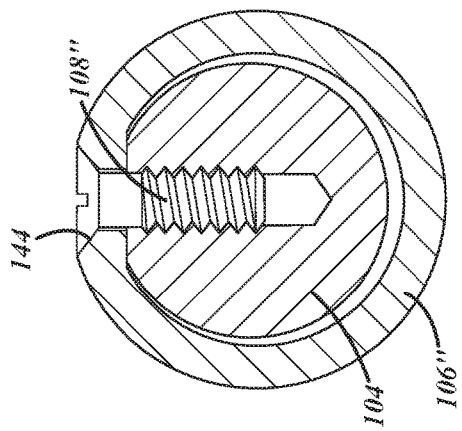
FIGS. 6-7 are cross-sectional views of alternative embodiments of systems for transferring torque from a driver to a driven object.
Figure 6:
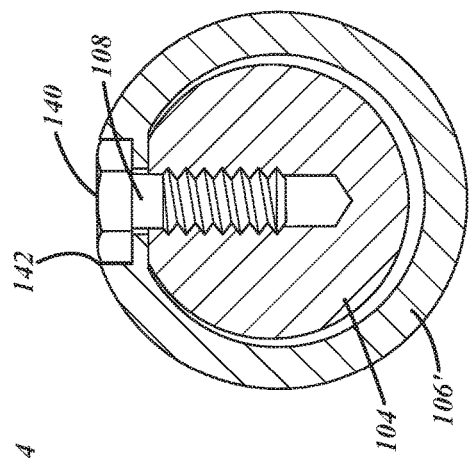

Fastener 108 couples hub 106 to shaft 104 and, more importantly, draws flats 118, 128 on shaft 104 and hub 106 towards one another to form a zero lash joint. Referring to FIGS. 4-5, fastener 108 may comprise a screw and includes a shank 138 and a head 140. Shank 138 is configured to extend through bore 130 in sleeve 122 of hub 106 and into bore 118 in shaft 104. At least a portion of shank 138 is threaded and is configured to engage the threads in bore 118 of shaft 104. Rotation of fastener 108 draws flat 128 on hub 106 towards flat 128 on shaft 104 to form a zero lash joint. During rotation, tensile force within fastener 108 forces compressive contact between flats 118, 128 on shaft 104 and hub 106. The tensile force is designed to maintain a sufficient compressive load at the interface between the flats 118, 128 to eliminate any separation during rotation. Head 140 is configured to engage flat 132 on the radially outer surface of hub 106. Referring to FIG. 6, in another embodiment, a hub 106' may be formed with a counterbore 142 configured to receive head 140 of fastener 108 instead of a flat on the radially outer surface (FIGS. 4-5). Head 140 of fastener 108 may be configured to be received without counterbore 142 and to engage a bottom wall of counterbore 142. Referring to FIG. 7, in yet another embodiment, a hub 106" may be formed with a countersink 144 configured to receive the head of a fastener 108". The head of fastener 108" may be conical in shape and engage the conical side walls of countersink 144. In accordance with some embodiments, fastener 108 (or 108") may include means for locking fastener 108 to one of shaft 104 and hub 106. For example, fastener 108 may include thread locking patch or fluid disposed along the threaded portion of shank 138. Alternatively, the head 140 of fastener 108 may be serrated to tightly engage flat 132 in shaft hub 106 (or the walls of counterbore 142 or countersink 144). In yet another embodiment, fastener 108 may include a lock washer 145 that is disposed about shank 138 and between the head 140 of fastener 108 and the flat 132 in hub 106.

Referring again to FIG. 2, linkages 110, 112 transmit torque from hub 106 to panels 14, 16 of door 12. In the illustrated embodiment, each linkage 110, 112 includes an elongate bar that is configured at one end for connection to a stub 134 of a corresponding arm and an opposite end for connection to a corresponding panel 14, 16 of door 12. Linkages 110, 112 may be retained on stubs 134 using snap rings (not shown) disposed within grooves formed in stubs 134.

Figure 9:
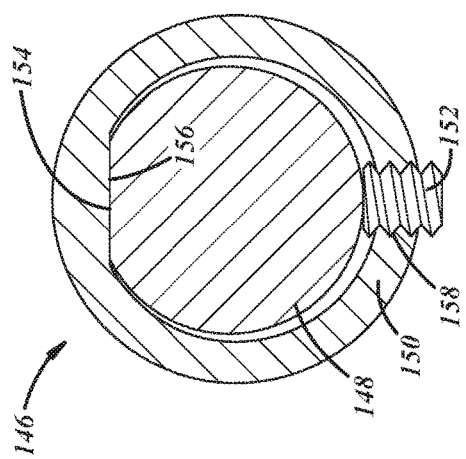
FIGS. 8-9 are cross-sectional views of another embodiment of a system for transferring torque from a driver to a driven object.
Figure 8:
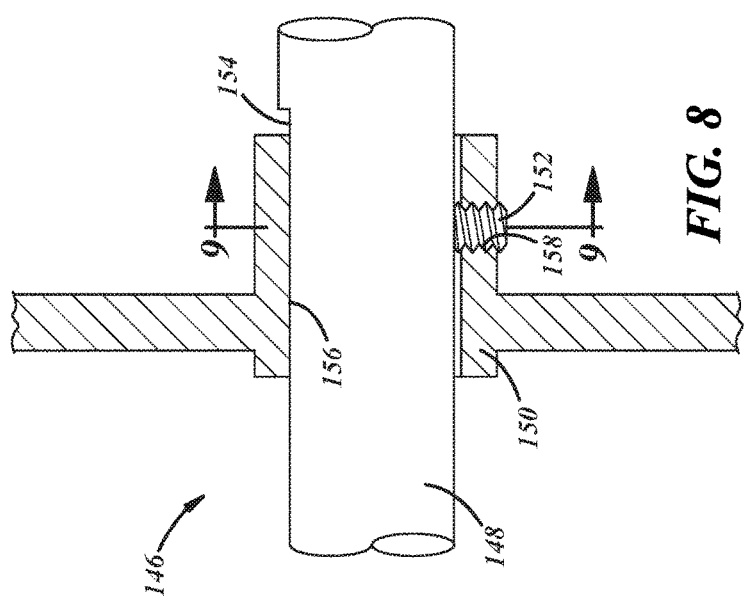

Referring now to FIGS. 8-9, an alternative embodiment of a system 146 for transferring torque from a driver, such as motion control system 24, to a driven object, such as bus door 12, is provided. System 146 is similar to system 28 described above and reference may be had to the description of system 28 for similar components. System 146 differs from system 28 in the configuration of shaft 148, hub 150 and fastener 152. Shaft 148 transmits torque from sector gear 102 to hub 150 and is similar to shaft 104 described above. Shaft 148 is again configured to form a zero lash joint with hub 150 and defines a flat 154 on a radially outer surface of the shaft 148 that is configured to engage hub 150. Hub 150 transmits torque from shaft 148 to linkages 110, 112 and is similar to hub 106 described above. Hub 150 defines a flat 156 on a radially inner surface configured for alignment with, and opposing, flat 154 on shaft 148. Hub 150 further defines a threaded through bore 158 that is disposed on a side of hub 150 diametrically opposite flat 156. Fastener 152 couples hub 150 to shaft 148 and, more importantly, urges flats 154, 156 on shaft 148 and hub 150 towards one another to form a zero lash joint. Fastener 152 may comprise a set screw. Fastener 152 extends through bore 158 and engages the radially outer surface of shaft 148 diametrically opposite flat 154 on the radially outer surface of shaft 148. Rotation of fastener 152 urges flat 156 on hub 150 towards flat 154 on shaft 148 to form a zero lash joint. During rotation, compressive force within fastener 152 forces compressive contact between flats 154, 156 on shaft 148 and hub 150. The compressive force is designed to maintain a sufficient compressive load at the interface between the flats 154, 156 to eliminate any separation during rotation. In accordance with some embodiments, fastener 152 may include means for locking fastener 152 to one of shaft 148 and hub 150 including, for example, thread locking patch or fluid. Although a single fastener 152 is shown in the illustrated embodiment, it should be understood that multiple fasteners similar to fastener 152 could be threaded through multiple bores within hub 150 similar to bore 158 to provide additional compressive contact between flats 154, 156.

Figure 10:
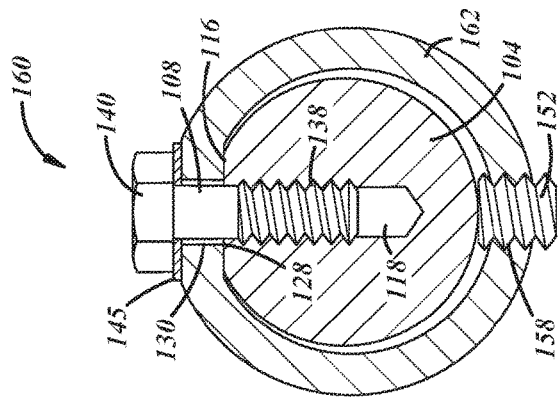
FIG. 10 is a cross-sectional view of another embodiment of a system for transferring torque from a driver to a driven object.

Referring now to FIG. 10, another alternative embodiment of a system 160 for transferring torque from a driver, such as motion control system 24, to a driven object, such as bus door 12, is provided. System 160 combines elements of system 28 and system 146 described above and reference may be had to the descriptions of system 28 and 146 for similar components. Because system 160 combines elements of systems 28 and 146, system 160 incorporates a different hub 162 that contains both through bore 130 from hub 106 and threaded bore 158 from hub 150 to receive fasteners 108 and 152, respectively. It should be understood that the any of the potential modifications discussed above to shaft 104 (e.g., making bore 118 a through bore) and hubs 106, 150 (e.g., incorporating a counterbore (FIG. 6) or countersink (FIG. 7) or incorporating multiple threaded bores 158 for multiple fasteners 152) may be applied equally to system 160.

A system in accordance the present teachings represents an improvement as compared to conventional systems for transferring torque and, ultimately, for opening and closing doors such as bus doors. In particular, the system enables torque transfer with zero lash or lost motion. The shaft 104 or 148 and hub 106, 150, or 162 in the system are also relatively easy to manufacture using common manufacturing techniques such as turning, broaching and/or milling and the system employs common fasteners 108, 152. Therefore, the system is relatively inexpensive. The joint is also relatively easy to assemble and disassemble—and therefore service—using common tools.

While the invention has been shown and described with reference to one or more particular embodiments thereof, it will be understood by those of skill in the art that various changes and modifications can be made without departing from the spirit and scope of the invention.

What is claimed is:

1. A system for opening and closing a door, comprising:
a shaft disposed about a rotational axis, the shaft defining a flat on a radially outer surface of the shaft and defining a threaded bore extending from the radially outer surface of the shaft towards the axis;
means for rotating the shaft about the rotational axis;
a hub configured for coupling to the door and defining a bore configured to receive the shaft therein, the hub defining a flat on a radially inner surface of the hub opposing the flat on the shaft and defining a through bore aligned with the threaded bore in the shaft; and,
a first fastener extending through the through bore in the hub and into the threaded bore in the shaft, rotation of the first fastener draws the flat on the hub towards the flat on the shaft
wherein the door comprises first and second panels and the hub comprises a bell crank hub having first and second radially extending arms, the system further comprising a first linkage coupled to the first arm and the first panel of the door and a second linkage coupled to the second arm and the second panel of the door.

2. The system of claim 1 wherein the hub has a shape that is complementary to a shape of a head of the first fastener and is configured to engage the head of the first fastener.

3. The system of claim 2 wherein the hub defines a flat on a radially outer surface of the hub configured to engage the head of the first fastener.

4. The system of claim 2 wherein the hub defines one of a counterbore and a countersink configured to receive the head of the first fastener.

5. The system of claim 1 wherein the through bore in the hub terminates at the flat on the radially inner surface of the hub and the threaded bore in the shaft terminates at the flat on the radially outer surface of the shaft.

6. The system of claim 1 wherein the through bore in the hub and the threaded bore in the shaft are centered about an axis extending perpendicular to the rotational axis.

7. The system of claim 1, further comprising means for locking the first fastener to one of the shaft and the hub.

8. The system of claim 1 wherein the shaft and the hub are configured for oscillating movement about the rotational axis.

9. The system of claim 1 wherein the hub defines a threaded through bore extending from a radially outer surface of the hub to the radially inner surface of the hub and further comprising a second fastener extending through the threaded through bore in the hub and engaging the radially outer surface of the shaft, rotation of the second fastener urging the flat on the hub towards the flat on the shaft.

10. The system of claim 9 wherein the second fastener engages the radially outer surface of the shaft diametrically opposite the flat on the radially outer surface of the shaft.

11. A system for opening and closing a door, comprising:
a shaft disposed about a rotational axis, the shaft defining a flat on a radially outer surface of the shaft;
means for rotating the shaft about the rotational axis;
a hub configured for coupling to the door and defining a bore configured to receive the shaft therein, the hub defining a flat on a radially inner surface of the hub opposing the flat on the shaft and defining a threaded through bore extending from a radially outer surface of the hub to the radially inner surface of the hub; and,
a fastener extending through the threaded through bore in the hub and engaging the radially outer surface of the shaft diametrically opposite the flat on the radially outer surface of the shaft, rotation of the fastener urges the flat on the hub towards the flat on the shaft wherein the door comprises first and second panels and the hub comprises a bell crank hub having first and second radially extending arms, the system further comprising a first linkage coupled to the first arm and the first panel of the door and a second linkage coupled to the second arm and the second panel of the door.

12. The system of claim 11 wherein the threaded through bore in the hub is centered about an axis extending perpendicular to the rotational axis.

13. The system of claim 11, further comprising means for locking the fastener to one of the shaft and the hub.

14. The system of claim 11 wherein the shaft and the hub are configured for oscillating movement about the rotational axis.

\* \* \* \* \*